US011873127B2

(12) United States Patent
Draghetti et al.

(10) Patent No.: US 11,873,127 B2
(45) Date of Patent: Jan. 16, 2024

(54) METHOD FOR FILLING A PACKAGE WITH PACKS

(71) Applicant: PHILIP MORRIS PRODUCTS S.A., Neuchatel (CH)

(72) Inventors: Fiorenzo Draghetti, Medicina (IT); Stefano Minoccari, Imola (IT)

(73) Assignee: Philip Morris Products S.A., Neuchatel (CH)

( * ) Notice: Subject to any disclaimer, the term of this patent is extended or adjusted under 35 U.S.C. 154(b) by 19 days.

(21) Appl. No.: 17/791,294

(22) PCT Filed: Jan. 13, 2021

(86) PCT No.: PCT/EP2021/050510
§ 371 (c)(1),
(2) Date: Jul. 7, 2022

(87) PCT Pub. No.: WO2021/144280
PCT Pub. Date: Jul. 22, 2021

(65) Prior Publication Data
US 2023/0034591 A1    Feb. 2, 2023

(30) Foreign Application Priority Data

Jan. 15, 2020  (EP) ..................... 20151870

(51) Int. Cl.
*B65D 85/10*   (2006.01)
*B65B 19/22*   (2006.01)
(Continued)

(52) U.S. Cl.
CPC ............ *B65B 19/228* (2013.01); *B65B 35/30* (2013.01); *B65G 47/086* (2013.01)

(58) Field of Classification Search
CPC ............ B65D 85/1072; B65D 5/48024; B65B 19/02; B65B 19/228; B65B 35/30; B65G 47/086
See application file for complete search history.

(56) References Cited

U.S. PATENT DOCUMENTS 2,346,788 A * 4/1944 Rice ................... B65D 5/48036
                                                    206/3
3,278,016 A    10/1966 Conti
(Continued)

FOREIGN PATENT DOCUMENTS

JP  H11171272    6/1999
WO  WO 2019/229212  12/2019

OTHER PUBLICATIONS

PCT Search Report and Written Opinion for PCT/EP2021/050510 dated Mar. 12, 2021 (13 pages).
(Continued)

*Primary Examiner* — Andrew M Tecco
(74) *Attorney, Agent, or Firm* — Mueting Raasch Group

(57) ABSTRACT

A method for filling a package with a group of pairs of packs, comprising supplying a group of pairs of packs simultaneously from a transport device to a package, vertically spacing the two packs of each pair of packs of the group of pairs of packs from each other in the package, and horizontally spacing each pair of packs from each other in the package. The method further comprises maintaining a horizontal spacing between each pair of packs of the group of pairs of packs while supplying the group of pairs of packs to the package by guiding the pairs of packs of the group of pairs of packs along space bars provided in the transport device.

11 Claims, 7 Drawing Sheets

(51) Int. Cl.
*B65B 35/30* (2006.01)
*B65G 47/08* (2006.01)

(56) References Cited

U.S. PATENT DOCUMENTS

| | | | | |
|---|---|---|---|---|
| 3,489,272 | A * | 1/1970 | Rosen | B65D 85/1072 |
| | | | | 229/120.07 |
| 3,536,246 | A * | 10/1970 | Rosen | B65D 5/48024 |
| | | | | 206/256 |
| 3,596,758 | A * | 8/1971 | Phillips, Jr. | B65D 85/1072 |
| | | | | 206/256 |
| 3,721,335 | A * | 3/1973 | Grant | B65D 85/1072 |
| | | | | 206/256 |
| 4,932,534 | A * | 6/1990 | Focke | B65D 5/5495 |
| | | | | 229/120.09 |
| 5,178,271 | A * | 1/1993 | Adams | B65D 5/5495 |
| | | | | 206/256 |
| 5,181,607 | A * | 1/1993 | Focke | B65D 5/5495 |
| | | | | 206/192 |
| 5,214,901 | A * | 6/1993 | Milliner | B65B 61/207 |
| | | | | 53/157 |
| 6,244,017 | B1 | 6/2001 | Focke | |
| 8,910,782 | B2 | 12/2014 | Koster | |
| 11,167,913 | B2 * | 11/2021 | Draghetti | B65D 85/1081 |
| 2004/0217023 | A1 | 11/2004 | Fagg | |
| 2012/0241339 | A1 | 9/2012 | Buse | |

OTHER PUBLICATIONS

International Preliminary Examination Report for PCT/EP2021/050510 dated Dec. 9, 2021 (14 pages).

* cited by examiner

METHOD FOR FILLING A PACKAGE WITH PACKS

This application is a U.S. National Stage Application of International Application No. PCT/EP2021/050510 filed Jan. 13, 2021, which was published in English on Jul. 22, 2021, as International Publication No. WO 2021/144280 A1. International Application No. PCT/EP2021/050510 claims priority to European Application No. 20151870.1 filed Jan. 15, 2020.

The present disclosure relates to a method for filling a package with a group of pairs of packs. In particular, the disclosure relates to a method for filling a package with a group of pairs of packs forming a collation of packs for tax stamp application.

For standard cigarette packs tax stamp application is an automated process. The position of a tax stamp on a pack is defined and frequently specified by national regulations. Therefore, tax stamp application machines exist that can reliably apply a tax stamp to a certain position. Accordingly, such machines will not be able to apply the correct position of the tax stamps for non-standard packs, for example, to packs that deviate from a standard size without some sort of machine adaptations. However, as these machines are typically used remotely, closer to the point of sale, it is difficult to adapt all of the machines to a new format. More recent products of the tobacco industry, for example those to be used in electronic aerosol-generating devices, have different sizes than conventional cigarettes. Thus, also packs comprising these products have different sizes. Thus, known machines for an automated processing of tax stamp application may not be adapted for high speed application of tax stamps on packs having sizes different than the standard size.

Accordingly, there is need for a method that reduces the manual handling of differently sized packs in a tax stamp application process. There is also need for a method that makes conventional tax application processes available for a variety of pack sizes.

According to an aspect of the present invention, there is provided a method for filling a package with a group of pairs of packs. The method comprises supplying a group of pairs of packs simultaneously from a transport device to a package, and vertically spacing the two packs of each pair of packs of the group of pairs of packs from each other in the package, and horizontally spacing each pair of packs from each other in the package. The method further comprises maintaining a horizontal spacing between each pair of packs of the group of pairs of packs while supplying the group of pairs of packs to the package by guiding the pairs of packs of the group of pairs of packs along space bars that are provided in the transport device. Preferably, one space bar is arranged in between neighbouring pairs of packs. Preferably, a vertical spacing and a horizontal spacing is kept constant.

By a group-wise filling of a package with pairs of packs a very efficient filling of a package may be achieved. The group-wise filling may be automatized such that manual handling of packs may be omitted. A filling speed of packages may be enhanced. In addition, misalignment upon manual insertion of packs into a package may be omitted. Yet further, by the group-wise filling, in particular if the group of packs is group-wise pushed from the transport device into the package, the risk of misalignment of individual packs within the group relative to each other upon transfer is minimized. Maintaining the position of the individual packs in the group, in particular maintaining and keeping the vertical and horizontal spacing between the packs and the pairs of packs in the group constant is desirable for a following tax stamp application process. In addition, the packs are guided along the space bars of the transport device upon transfer of the packs into the package. This additionally prevents a misalignment of the packs. The space bars also define a horizontal spacing between the pairs of packs upon transfer of the packs into the package. In addition, the guiding of the group of pairs of packs with space bars also allows to simplify the design of pushing means for the group-wise pushing.

For example, a pushing means may be a block pusher. The block pusher may have the form of simple plates. For example, a plate may be provided for pushing each of the packs individually or plates may be provided to push several packs of the group together. Preferably, the block pusher is in the form of twin plates: an upper plate may be provided for pushing the upper packs of the group of pairs of packs and a lower plate may be provided for pushing the lower packs of the group of pairs of packs. Plates, in particular plates pushing several packs may be provided with longitudinal recesses. Space bars may extend into the recesses while the block pusher pushes the packs out of the horizontal transport device. Also a vertical distance between twin plates allows for any spacing elements to extend in between the plates without hindering the transfer process of the group of packs.

The vertical as well as the horizontal spacing between individual packs allow to position the packs in the package at predefined and specific positions. A position of a pack in the package may be varied by varying a horizontal or a vertical spacing between the packs or by varying a horizontal and a vertical spacing between the packs. This in particular advantageous as the position of the packs in the package may be kept at a predefined position independent on a size of the packs.

The vertical as well as the horizontal spacing may be defined such that the individual packs are positioned to be processed in conventional tax stamp application devices. Preferably, the packs are vertically and horizontally spaced in the package such that a position of a center of a pack is predefined and fixed, independent on a size of the pack. Preferably, a position of a center of a pack is in particular predefined and fixed in the package, independent on a depth and a width of the pack.

A center of a pack is herein understood to define a geometrical center of the pack. A center of a pack is typically understood as the longitudinal middle axis of the pack or as an intersecting point of the middle axis with a front side of a pack. The front side of the pack is herein defined as the side of the pack where a tax stamp is to be applied to.

The group of pairs of packs may be provided in an arrangement as required in conventional pack assemblies. For example, in boxes containing cigarettes, typically ten cigarette packs are assembled as five pairs arranged next to each other. In conventional tax stamp applications two cigarette packs of a pair of cigarette packs are lying on top of each other. Each pack is provided with a tax stamp. The position of the tax stamp on a pack is predefined and the position of the pack in a tax stamp application device is standardized for correct stamp positioning on the pack. By the vertical and horizontal spacing of the packs tax stamp positioning requirements of the packs for conventional tax stamp application processes may be met for various pack size dimensions. The various pack size dimensions particularly refer to pack depth and pack width. In particular, packs with smaller width and depth dimensions may be positioned in the package such as to have an exact positioning for being provided with tax stamps in a conventional tax stamp application device.

The method may comprise providing a pack spacer in the package for the vertical spacing between packs and providing pair spacers in the package for the horizontal spacing between pairs of packs. The pack spacer and the pair spacers may be individual elements of the package. The pack spacer and the pair spacers may be integral with the package.

The pack spacer may be a single element vertically separating all pairs of packs of the group of pairs of packs in the package. The pack spacer may comprise several partial pack spacers, preferably one partial pack spacer for vertically separating each pair of packs.

Preferably, the pack spacer extends over the group of pairs of packs.

A pair spacer may be provided between each two neighbouring pairs of packs. A pair spacer may also be arranged between a pair of packs and an end of the package.

Preferably, the method comprises providing pair spacers between pairs of packs only, thus not at ends of a package.

Preferably, a pair spacer securely horizontally spaces upper and lower pack of a pair of pack from an upper and lower pack of a neighbouring pack. Accordingly, a pair spacer is preferably arranged between upper and lower packs of neighbouring pairs of packs.

Preferably, pair spacers are formed by strips extending into the interior of the package.

One or more, for example two, strips may extend from one side or from opposite sides into the interior of the package.

For example, a single strip may extend from one side of the package through the package and form a pair spacer for two neighbouring pairs of packs. Strips may extend from two opposite sides of the package and into the interior of the package. Thereby, the strips of one side may form a partial pair spacer for an upper or lower pack only. The strips of one side may also each form a pair spacer for the pair of packs.

Preferably, the method comprises supplying a blank of sheet material and manufacturing the pack spacer and the pair spacers from a blank of sheet material.

Preferably, the method comprises a continuous supply of blank of sheet material.

The blank of sheet material may be, for example, a sheet of paper or cardboard, a sheet of plastics material or a metal foil.

A package including pack spacer and pair spacers may be formed integral from the blank of sheet material. This is advantageous as folding and processing a blank of sheet material may be automatized. Manual handling of the blank may thus not be required or may be minimized. Blanks of cardboard, for example, are cost efficient materials that may be made of recycled material or that may be recycled after use.

With a blank of sheet material for a package various methods of forming pack spacers and pair spacers from the blank of sheet material are available. For example spacers may be formed by folding the blank. Spacers may also be folded by portions of the blank being displaced from the plane of the blank. For example, the blank may be provided with protrusions or flaps. For forming flaps, the blank may be pre-cut. The pre-cut portions may be pushed out of the plane of the blank forming a flap.

Preferably, the method comprises providing a strip former and pushing the strip former into the package at locations of pre-cut strips in the blank of sheet material, thereby forming the pair spacers.

Strips are very simple forms that may easily be pre-cut in a blank and may form flaps. For example, a single strip may be formed from a pre-cut in the blank in the shape of the letter U. Two strips may be formed from a pre-cut in the blank in the shape of the letter H. Strips may be pushed out of the blank by simple means. For example a strip former may have a simple form and may perform a simple movement, for example a pure linear or a pure rotational movement.

The method may comprise pushing one or several pre-cut strips of the blank of sheet material from one side into the package. The method may comprise pushing one or several pre-cut strips of the blank of sheet material from opposite sides into the package.

Preferably, the method comprises pushing the pre-cut strips of the blank of sheet material from opposite sides into the interior of the package. For example, the pre-cut strips are pushed from above and below into the package with respect to a horizontal plane. In these embodiments, pre-cut strips pushed in from above then preferably form part of the pair spacer for the upper packs of two neighbouring pairs of packs. The pre-cut strips pushed in from below then preferably form part of the pair spacer for the lower packs of the same two neighbouring pairs of packs.

Preferably, the method comprises forming several pair spacers simultaneously. Preferably, all pair spacers of one package are formed simultaneously. Forming several or all pair spacers of a package simultaneously provides a very efficient and time saving way of forming pair spacers.

A strip former may be embodied, for example, as a piston-like element, as a lever-like element or as a wheel comprising a cam surface. These elements may be moved versus and into the folded blank of sheet material to form the pair spacers. One or two such elements are provided to treat the package from one side or from opposite sides.

Preferably, the strip former comprises two counter-rotating levers. The counter-rotating levers may rotate versus and away from each other. A package may be arranged in between the two levers. For forming the pair spacers the counter-rotating levers are rotated versus each other. After having formed the pair spacers, the counter-rotating levers are rotated away from each other. The package provided with the pair spacers may then be transported away for further processing.

Preferably, the strip former comprises a series of pusher heads arranged in parallel and distanced to each other. The pusher heads may be arranged at an end of a piston-like element or of a lever-like element, preferably of a counter-rotating lever. A pusher head of the strip former is pushed into the blank forming the pair spacers. The serial arrangement allows for a simultaneous and reliably positioned forming of pair spacers.

Preferably, a pusher head is smaller than the width of a pre-cut-strip in a blank for forming the pair spacer to account for manufacturing tolerances. With a smaller tool manufacturing the pair spacers, accidental damage to an outer wrapper of a pack may be prevented when inserting the pusher head between the packs. A pusher head may, for example, be 2 millimeter, more preferably 1.5 millimeter, for example 1 millimeter or 0.5 millimeter or 0.2 millimeter or 0.1 millimeter smaller than the width of a pair spacer.

The groups of pairs of packs may be supplied to the package after the pack spacer has been provided in the package. In particular the group is supplied to the package after the pack spacer has been formed, for example folded from a blank of sheet material. Preferably, the pack spacer is manufactured by a horizontally arranged fold of the blank, wherein the horizontally arranged fold extends into a receiving direction of the group of pairs of packs. By this, a vertical spacing of the packs may be guaranteed during and after supply of the group of pairs of packs to and into the package.

The groups of pairs of packs may be supplied to the package before or after the pair spacers have been provided, in particular before the pair spacers have been formed from a blank of sheet material.

Preferably, the method comprises supplying the group of pairs of packs simultaneously into the package before forming the pair spacers. The supply of the group of packs to the package with no pair spacers provided yet in the package may reduce the risk of crushing packs or pair spacers. After the group of pairs of packs has been supplied to the package, the pair spacers are formed. In particular, the pair spacers are positioned in the horizontal space in between neighbouring pairs of packs. The pairs of packs are then fixed in their horizontal position in the package by the pair spacers. For better fixing of the packs, a horizontal extension of a pair spacer may be slightly larger than the horizontal space in between neighbouring pairs of packs to achieve a friction fit between with the packs.

Preferably, the package comprises all spacers and is provided with the group of pairs of packs.

Preferably, the package forms an insert for a carton. Preferably, the insert comprises the pair spacers and the pack spacer in the carton. Preferably, the insert is made from a blank of sheet material. The package may then be inserted into a carton as an insert. Thereby, the carton may have sizes corresponding to the sizes of a conventional box for conventional cigarettes. The package forming the insert makes up for any differences in sizes of the individual packs compared to conventional cigarette pack sizes such that package and packs preferably fill the carton.

Preferably, a vertical spacing is in a range between 2 millimeter and 10 millimeter, more preferably in a range between 4 millimeter and 8 millimeter, for example 6 millimeter, in the package. Vertical distances in these size ranges may make up for a difference between a depth of a conventional cigarette pack and depth sizes of packs with smaller depth dimensions.

Preferably, a thickness of a pack spacer combined with a depth of one pack of the pair of packs amounts to a depth of a standard pack of 22 millimeter. Preferably, the thickness of the pack spacer makes up for the difference of a standard pack depth and the reduced depth of a pack with smaller depth dimension to be handled in the method of the present invention.

Preferably, a horizontal spacing is at least 1.5 millimeter, and preferably is in a range between 2 millimeter and 20 millimeter, more preferably in a range between 4 millimeter and 12 millimeter, for example in a range between 4 millimeter and 7 millimeter. Preferably, a horizontal extension of a pair spacer combined with a width of a pack of the pair of packs amounts to a width of a standard pack of 56 millimeter.

Horizontal distances in these size ranges may make up for a difference between a width of a conventional cigarette pack and width sizes of packs with smaller depth dimensions. In particular, the horizontal extension of a pair spacer or the horizontal spacing in between neighbouring pairs of packs may make up for a smaller width of a pack compared to conventional cigarette packs.

The method may comprise providing the pair spacers at a horizontal distance to each other in a range between 25 millimeter and 60 millimeter, more preferably between 30 millimeter and 55 millimeter in the package. Distances of pair spacers in these size ranges allow the supply of a variety of pack sizes in a package using a carton of standard box sizes.

Preferably, the pair spacers have a horizontal extension of at least 1.5 millimeter, and preferably have a horizontal extension in a range between 2 millimeter and 20 millimeter, more preferably in a range between 4 millimeter and 12 millimeter, for example in a range between 4 millimeter and 7 millimeter. By the provision of pair spacer, neighbouring packs are horizontally distanced from each other in the package by at least 1.5 millimeter. Preferably, a horizontal extension of a pair spacer combined with a width of any of the packs of a pair of packs amounts to a width of a standard pack of 56 millimeter. Thus, the width of a pair spacer or the horizontal spacing in between neighbouring pairs of packs may make up for a smaller width of a pack compared to conventional cigarette packs.

A horizontal extension of a pair spacer may be slightly larger than a horizontal spacing in order to create a friction fit with the packs and keep them in place. Thus, a horizontal extension of a pair spacer may for example be 0.5 millimeter, 0.7 millimeter or 1 millimeter larger than a horizontal spacing between neighbouring pair of packs.

The method may comprise adapting a horizontal extension of the pair spacers, and maintaining a distance between a center of a front side of a pack and a center of a front side of a neighbouring pack at 56 millimeter, dependent on a size of the packs.

This may, for example, be achieved by differently sized pair spacers. For example strips forming the pair spacers may have different horizontal extensions. Broad strips may be provided for smaller packs, small strips may be provided for larger packs. For example, different pre-cuts may be provided in a same blank of sheet material. Depending on the size of a pair spacer required, different pre-cuts may be used for forming the pair spacers.

The method may further comprise transporting the package to a tax stamp application device and providing a front of each pack of the group of pairs of packs in the package with a tax stamp. In general, a filled carton is closed, packed into a shipping case with several further cartons and shipped to a destination, for example, imported into a different country. There, a shipping case is then opened, the packs accommodated in the carton are provided with a tax stamp, the carton closed again and shipped back to the manufacturer of the packs.

All packs in a carton may have the same size or may have different sizes. For example, a pair of packs may comprise two packs of different size. Or, for example, neighbouring pairs may comprise packs having different sizes.

Preferably, all packs in a carton have a same size.

Preferably, the supplying of the group of pairs of packs simultaneously in the package comprises receiving the group of pairs of packs from a horizontal transport device, wherein a vertical spacing between the two packs of each pair of packs in the horizontal transport device and a horizontal spacing between each pair of packs in the horizontal transport device is kept constant while the group of pairs of packs is supplied to the package from the horizontal transport device. This may be advantageous as transfer of the packs may be performed at same levels.

The method may further comprise arranging a first pair of packs on the horizontal transport device, transporting the first pair of packs in a horizontal direction, arranging a second pair of packs on the horizontal transport device: and therein for each of the first and second pair of packs spacing a first pack of the pair of packs and a second pack of the pair of packs vertically from each other and further spacing the first pair of packs and the second pair of packs horizontally from each other on the horizontal transport device.

The method allows to arrange and transport packs on a horizontal transport device, such that all packs are vertically and horizontally distanced from each other. The vertical as well as the horizontal spacing may be determined such that the individual packs are positioned to be processed in conventional tax stamp application devices. Preferably, the packs are vertically and horizontally spaced in the horizontal transport device such that a position of a center of a pack is predefined and fixed, independent of a size of the pack. Preferably, a position of a center of a pack is in particular predefined and fixed in the horizontal transport device, independent from a depth and a width of the pack.

The method may, further comprise:
providing a supply of individual packs;
arranging the first pack in a vertical transport device;
arranging the second pack in the vertical transport device, thereby arranging the second pack vertically spaced from the first pack in the vertical transport device;
vertically transporting the first and the second pack in the vertical transport device; then
simultaneously pushing the first and second packs as a pair of packs out of the vertical transport device and into the horizontal transport device, wherein the first and second packs are transferred in a vertically spaced manner as the pair of packs to the horizontal transport device.

A vertically spaced arrangement of first and second packs in a vertical transport device allows to transport and supply the packs upwards or downwards. A vertical transport device also allows to vertically position the two packs relative to each other, in particular independent of the depth of the packs. Thus, a vertical spacing of the packs may be adjusted depending on the depth of the packs. A vertical spacing may in particular be adjusted such that a center of the first pack has a same distance from a center of the second pack irrespective of depth of the pack. For example, packs with larger depth dimensions may vertically be distanced from each other less than packs with smaller depth dimensions in order to keep a center to center distance between first and second pack constant. It is to be understood that a vertical spacing between two packs may also be adjusted with respect to other reference points or lines. For example, a center of a first pack and an upper or lower side of a second pack may be kept constant With the simultaneous pushing of the vertically spaced pair of packs and maintaining the vertical spacing of the pair of packs in the horizontal transport device, a pair of packs may be provided in an arrangement as required in conventional pack assemblies. This may in particular be achieved for packs with smaller depth dimensions as the vertical spacing may make up for a difference to the depth of conventional packs.

By the simultaneous or pair-wise pushing of the pair of packs with the required vertical distance to each other tax stamp positioning requirements of the packs for conventional tax stamp application processes may be met for various pack size dimensions, in particular various pack depths. More particularly, packs with smaller depth dimensions may be positioned such as to be provided with a tax stamp in conventional tax stamp application devices.

The method as described herein is preferably used in an application process of tax stamps. Preferably, the packs are packs used in the tobacco industry. Preferably, the packs comprise articles of the tobacco industry. Such articles may be, for example, aerosol-generating articles, preferably tobacco containing aerosol-generating articles. Such articles are used in electronic aerosol-generating devices, where the articles may, for example, be heated for aerosol generation.

Preferably, the method comprises vertically transporting the first pack in the vertical transport device before arranging the second pack in the vertical transport device. Preferably, the first pack is transported upwards in the vertical transport device and the second pack is then supplied below the first pack. By transporting an already supplied pack in the vertical direction, a supply position for the second or of further packs may remain the same. This may simplify the process of pack supply and of a pack supply device.

Preferably, the first pack and the second pack are arranged at a vertical distance of between 2 millimeter and 10 millimeter, more preferably between 4 millimeter and 8 millimeter, for example 6 millimeter, in the vertical transport device. Vertical distances in these size ranges may make up for a difference between a depth of a conventional cigarette pack and depth sizes of packs with smaller depth dimensions. Packs with smaller depth dimensions may in particular comprise aerosol-generating articles, for example tobacco containing aerosol-generating articles, for use in electronic aerosol-generating devices.

Preferably, the method comprises a clocked, preferably uninterrupted supply of individual packs to the vertical transport device. By an uninterrupted supply of packs, a pair-wise arrangement of packs may be achieved in the vertical transport device. This also allows to cyclically pushing out pairs of packs from the vertical transport device to the horizontal transport device. The method may comprise subsequently arranging further packs in a vertically spaced manner in the vertical transport device. Preferably, the method then comprises arranging the first, the second and the further packs vertically spaced from each other and preferably in a pair-wise manner in the vertical transport device.

The packs may perform a continuous or a discontinuous vertical movement in the vertical transport device. Preferably, the packs perform a discontinuous vertical movement. Preferably, a pack is transported vertically in a step-wise manner. During the breaks a next pack may be supplied to the vertical transport device. The breaks also allow to push out the pairs of packs from the vertical transport device while the pair of packs is stationary in the vertical transport device.

Preferably, the method comprises subsequently, preferably discontinuously, pushing pairs of packs from the vertical transport device to the horizontal transport device. A subsequent pushing out of pairs allows for an on-going supply of pairs of packs to the horizontal transport device.

Preferably, the method comprises pushing the pair of packs in a horizontal direction from the vertical transport device to the horizontal transport device. With a horizontal movement of the pair of packs a tilting or jamming of a pack in the vertical transport device may be minimised.

A vertical spacing between first and second pack may be the same or may be different in the vertical transport device and in the horizontal transport device. Preferably, a vertical spacing between first and second pack is maintained throughout the handling of the packs, namely in the vertical transfer device, upon transfer to the horizontal transport device and in the horizontal transport device but also in and further pack handling step. The vertical spacing does not need to be constant during each transfer step or in each device. Preferably, a vertical spacing once defined in the vertical transfer device, is kept throughout the handling of the packs. Preferably, the vertical spacing of the first and second pack in the vertical transport device corresponds to a final vertical spacing of a pair of packs for tax stamp application or to a final vertical spacing in a package. As such, the method preferably comprises arranging the first and second pack of the pair of packs at a same vertical distance in the horizontal transport device as in the vertical transport device. Preferably, a vertical spacing between first and second pack is maintained at a same magnitude when the pair of packs is pushed out of the vertical transport device and into the horizontal transport device. This may be advantageous as transfer of the packs may be performed at same levels.

The vertical transport device may comprise two treaded belt conveyors arranged in parallel. A pack to be transported in vertical direction is held between the two belt conveyors supported by a tread of each of the belt conveyors. Preferably, a height of a tread of the treaded belt conveyors then defines a minimum vertical spacing between first and second pack. Belt conveyors, in particular closed loop conveyors, are known for a reliable continuous transport of goods. Treaded belt conveyors allow to define a minimum distance between individual transported packs by the size or height of the treads. Shall differently sized packs be transported in the vertical transport device, this may easily be realized by replacement of the belt conveyors. It is also possible to provide differently sized treads to the belt conveyors.

A pair of packs may be pushed out of the vertical transport device by a pair pusher. A pair pusher may be in the form of a piston pushing the pair of packs. Preferably, a pair pusher acts in a direction perpendicular to a moving direction of the packs in the vertical transport device. If the vertical transport device comprises two treaded belt conveyors, a pushing out of the pair of packs may be realized by inserting a pair pusher in between the two treaded belt conveyors for pushing the pair of packs out of the vertical transport device.

Preferably, a gap is provided between pairs of packs in the vertical transport device, which gap is larger than the vertical spacing between the packs of a pair of pack. Preferably, the gap corresponds to an empty pack compartment in the vertical transport device.

Preferably, the belt conveyors of the vertical transport device moves at two different speeds. A first speed move the belts by the distance of a pack compartment to a position such that a next empty pack compartment may be provided with a next pack. A second faster speed moves the belt by the distance of a filled and an empty pack compartment following a pair of packs in the vertical transport device. By the faster speed the gap is formed after the two filled subsequent pack compartments.

The empty pack compartment allows a pair pusher to retract after having pushed the pair of pack out of the vertical transport device.

A speed of a pair pusher may be different when pushing the pair of packs and when retracting. Preferably, a speed of the pair pusher is slower when pushing and faster when retracting. The higher retraction speed is possible as no interaction with packs occurs upon retraction of the pair pusher.

A vertical transport device, in particular two treaded belt conveyors transporting the packs, may have a capacity for an even or uneven number of packs. Preferably, the capacity comprises an even number of packs, for example 2, 4, 6, 8, 10 or 12 packs. The capacity for packs may directly correspond to a number of pack compartments. Preferably, the capacity also includes empty space compartments if present to achieve the preferred capacity for packs.

In the horizontal transport device, the vertically spaced packs of a pair of packs are maintained in a vertically spaced manner. Preferably, the method comprises vertically spacing the first and second pack in the horizontal transport device by a partition element of the horizontal transport device. A partition element may be a simple means positioned between the packs in the horizontal transport device. A partition element may, for example, be a spacer plate, spacer pins or a partition plate. The partition element may be a single element vertically separating one pair of packs or several pairs of packs. Preferably, a partition element extends over several pairs of packs, for example a group of pairs of packs.

Preferably, a thickness of the partition element combined with a depth of the first or of the second pack amounts to a depth of a standard pack of 22.5 millimeter. Preferably, the thickness of the partition element makes up for the difference of a standard pack depth and the reduced depth of a pack with smaller depth dimension to be handled in the method of the present invention. A reference position on a pack is the future position of a tax stamp and as such the center of the pack. A partition element arranged between two packs typically makes up for only half the difference between the depth of a pack and a standard pack but for each of the two packs the partition element is arranged in between.

The method may comprise a pack supply device supplying individual packs to the vertical transport device. The pack supply device may comprise a supply wheel. The method may comprise providing the supply of individual packs to the vertical transport device from the supply wheel. The supply wheel comprises circumferentially arranged pockets, wherein each pocket is provided for accommodating an individual pack. Supply wheels are preferred supply devices as wheels perform simple movements. A rotational speed and an adaption of a supply speed may easily be varied with a supply wheel. In addition, supply wheels allow for a loading to and unloading from the supply wheel at different locations. On the way from a loading to an unloading location, packs on the supply wheel may pass a control station.

The method may further comprise controlling an individual pack on the supply wheel, and in case of non-compliance of the controlled individual pack, not supplying the individual pack to the vertical transport device. Thus, in case of non-compliance of a pack with reference data, a pack may be instead of being supplied to the vertical transport device. Such a control allows to detect and remove defective individual packs. An individual pack may be removed before pairs or even groups of packs including a defective pack have been formed that need to be rejected. By this, material waste may be reduced. Possibly, also interruption of the handing process of the packs at a later stage may be limited or even avoided.

For example, the method may comprise controlling a bar code or a dot code on the individual pack and checking the controlled bar code or dot code for correctness. The method may further comprise rejecting the controlled individual pack if the controlled bar code or dot code on the individual pack is defective. Different or further features may be controlled. Such features are, for example, a ruptured pack, a deformed pack or misaligned marks on a pack.

The method also allows to arrange groups of pairs of packs in a horizontally spaced manner on the horizontal transport device. With the vertical and horizontally spaced arrangement of packs on the horizontal transport device, a group of pairs of packs may be provided in an arrangement as required in conventional pack assemblies.

In particular, packs with smaller width and depth dimensions may be positioned on the horizontal transfer device such as to have an exact positioning for being provided with tax stamps in a conventional tax stamp application device.

Preferably, the method comprises horizontally spacing the first and second pair of packs from each other in a range between 2 millimeter and 20 millimeter, more preferably in a range between 4 millimeter and 12 millimeter, for example between 4 millimeter and 7 millimeter on the horizontal transport device.

Horizontal distances in these size ranges may make up for a difference between a width of a conventional cigarette pack and widths of smaller packs. Smaller packs are in particular packs comprising aerosol-generating articles, for example tobacco containing aerosol-generating articles, for use in electronic aerosol-generating devices.

The method may comprise providing space bars in the horizontal transport device in a horizontally distanced manner, and arranging the first or second pack of the pair of packs in between the space bars. Space bars are simple means to define a distance between packs. By varying a width of a space bar, a distance between neighbouring packs may be varied and adapted to differently sized pack widths. Shall differently sized packs be transported in the horizontal transport device, this may easily be realized by providing differently sized space bars in the horizontal transport device.

Space bars may be horizontally distanced from each other in a range between 25 millimeter and 60 millimeter, more preferably between 30 millimeter and 55 millimeter in the horizontal transport device.

Space bars may have a horizontal extension of at least 1.5 millimeter. Preferably space bars have a horizontal extension in a range between 2 millimeter and 20 millimeter, more preferably in a range between 4 millimeter and 12 millimeter, for example between 4 millimeter and 7 millimeter. Thus, by the provision of a space bar, neighbouring packs are horizontally distanced from each other in the horizontal transport device by at least 1.5 millimeter. Preferably, a horizontal extension of a space bar combined with a width of the first or second pack of a pair of packs amounts to a width of a standard pack of 56 millimeter. Thus, the width of a space bar or the horizontal spacing in between neighbouring pairs of packs may make up for a smaller width of a pack compared to conventional cigarette packs.

Preferably, the method comprises spacing the first pack of the pair of packs and the second pack of the pair of packs vertically from each other in a range between 2 millimeter and 10 millimeter, more preferably between 4 millimeter and 8 millimeter, for example 6 millimeter, on the horizontal transport device.

Vertical and horizontal spacing in between packs and pairs of packs may make up for smaller pack sizes compared to conventional cigarette packs. In particular, packs comprising aerosol-generating articles, for example tobacco containing aerosol-generating articles, for use in electronic aerosol-generating devices, may form packs with smaller depth dimensions.

A vertical spacing between packs of pairs of packs may be realized by different means. For example, the method may comprise individually clamping the first and second pack of a pair of packs in the horizontal transport device. Thereby, the first and second packs are kept in their vertically spaced position. Alternatively, or in addition, the method may comprise keeping the first pack of the pair of packs and the second pack of that pair of packs vertically spaced from each other in the horizontal transport device by providing a partition element in between the first and second packs.

Clamping may, for example, be achieved by clamping a pack between two neighbouring space bars that are provided in the horizontal transport device. However, clamping may lead to pack deformation. A partition element may be a simple means positioned between the packs in the horizontal transport device.

Accordingly, the method may comprise providing the partition element in between first and second packs of several pairs of packs. Preferably, the partition element is provided between three to six pairs of packs, for example five pairs of packs. Therein, the several pairs of packs may form a group.

Preferably, the partition element allows the packs to slide on or along the partition element. Preferably, the partition element allows a sliding along the partition element during a horizontal transport of the packs.

The horizontal transport device may comprise two belt conveyors arranged in parallel and above each other. Space bars may be arranged between the two belt conveyors and perpendicular to a transport direction of the two belt conveyors. Preferably, the space bars are arranged on each of the two belt conveyors on the sides of the belt conveyors facing each other. The first and second pair of packs may then be arranged in between the two belt conveyors and in between space bars. Thus, pairs of packs may be guided from below and from above by the two belt conveyors, while the packs are arranged and secured by the space bars that are provided between the belt conveyors.

The pairs of packs may be transported in a continuous or discontinuous manner in the horizontal transport device. For a supply of pairs to the device or a further processing of groups of pairs of packs from the horizontal transport device, the pairs of packs are preferably horizontally transported in a discontinuous manner. Interruption in the transport allows for example for a loading of pairs of packs to the horizontal transport device, while the horizontal transport device is stationary. Also, an unloading of pairs of packs from the horizontal transport device may be performed in a well-controlled manner if the horizontal transport device is stationary. In particular, with a stationary belt conveyor a pair of packs may be pushed in between space bars and out of the space bars in a controlled manner.

The method may further comprise providing several pairs of packs on the horizontal transport device and pushing a group of pairs of packs from the horizontal transport device into a package.

Preferably, by the pushing of a group of pairs of packs from the horizontal transport device into a package, a vertical spacing between the two packs of a pair of packs and a horizontal spacing between the pair of packs is maintained. Preferably, a vertical spacing and a horizontal spacing is kept constant.

The method may comprise a block pusher and pushing the group of pairs of packs simultaneously into the package by the block pusher.

By pushing a group of packs from the horizontal transport device, in particular pushing the group as a whole, all packs of the group may simultaneously be transferred.

A group of pairs of packs preferably consists of three to six pairs of packs, for example five pairs.

Preferably, the pairs of packs are transported horizontally on the horizontal transport device in a step-wise manner. During the breaks a next pair of pack may be supplied to the horizontal transport device.

Preferably, a gap is provided between groups of pairs of packs in the horizontal transport device, which gap is larger than a space bar arranged between a pair of pack. Preferably, the gap corresponds to an empty pair of pack compartment in the horizontal transport device.

Preferably, the belt conveyors of the horizontal transport device move at two different speeds. A first speed moves the belts by the distance of a pair of packs compartment to a position such that a next empty pair of packs compartment may be provided with a next pair of packs. A second faster speed moves the belts by the distance of a filled and an empty pair of packs compartment following a group of pair of packs in the horizontal transport device. By the faster speed the gap is formed after the several filled subsequent pair of packs compartments forming a group of pairs of packs.

The empty pair of packs compartment allows a block pusher to retract after having pushed the group of pairs of packs out of the horizontal transport device into the package.

A speed of a block pusher may be different when pushing the group of pairs of packs and when retracting. Preferably, a speed of the block pusher is slower when pushing and faster when retracting. The higher retraction speed is available as no interaction with the groups of packs occurs upon retraction of the block pusher.

The packs in a group of pairs of packs are preferably vertically separated in the horizontal transport device by a partition element. The partition element is removed upon transfer of the group of pairs of packs. The method preferably comprises removing a partition element provided in between the two packs of the pair of packs in the horizontal transport device upon pushing the group of pairs of packs into the package. Preferably, the partition element is removed from each pair of packs of the group while being pushed into the package.

A partition element provided in between the two packs of the pair of packs in the horizontal transport device may, for example, be replaced by a pack spacer in the package upon pushing the group of pairs of packs into the package. Preferably, the pack spacer maintains a vertical spacing between the packs of the pairs of packs of the group in the package.

In this application, the "front" side is the side of the pack intended for applying a tax stamp. It is defined as the side of the pack that faces an opening of a carton the packs are arranged in for tax stamp application. In particular, in conventional hinged lid cigarette packs, the "front" side is the side of the pack that is normal to the longitudinal extension of the cigarettes. Aerosol-generating articles may have significantly shorter lengths than conventional cigarettes and are therefore frequently packed in different packs, for example in a comparatively wide hinged lid box with two bundles with a 5-5 stick collation arranged next to each other (or a 10-10 collation if only a single bundle is provided). Accordingly, the "front" side of such a pack comprising aerosol-generating articles may be represented by one of the two opposite long small sides. In such a pack, the aerosol generating articles would be arranged perpendicular to the direction of the hinge, but parallel to the direction of the "front" side of the pack.

If not explicitly specified otherwise, the packs in the present invention are arranged with one of their large sides facing downwards and with their opposite large side facing upwards. When two packs are arranged above each other, one large side of the first pack faces one large side of the second pack.

Combined distances in a package include a tolerance in a range between 0.3 millimeter and 1 millimeter, typically 0.5 millimeter. Thus, when referring to a size of a pack and a spacer amounting to a certain number, this includes a tolerance such that size of pack and size of spacer may exactly correspond to said number but generally include a tolerance in the given range. For example, a pack and a pair spacer, a pack and a package wall, a pack and a pack spacer generally include a gap in between the two objects a range between 0.3 millimeter and 1 millimeter, typically 0.5 millimeter.

Below, there is provided a non-exhaustive list of non-limiting examples. Any one or more of the features of these examples may be combined with any one or more features of another example, embodiment, or aspect described herein.

EXAMPLE EX1

A method for filling a package with a group of pairs of packs, comprising:
supplying a group of pairs of packs simultaneously from a transport device into a package, and
vertically spacing the two packs of each pair of packs of the group of pairs of packs from each other in the package, and
horizontally spacing each pair of packs from each other in the package, further comprising
maintaining a horizontal spacing between each pair of packs of the group of pairs of packs while supplying the group of pairs of packs to the package by guiding the pairs of packs of the group of pairs of packs along space bars provided in the transport device.

EXAMPLE EX2

The method according to example Ex1, providing a pack spacer in the package for the vertical spacing between packs and providing pair spacers in the package for the horizontal spacing between pairs of packs.

EXAMPLE EX3

The method according to example Ex2, further comprising supplying a blank of sheet material and manufacturing the pack spacer and the pair spacers from the blank of sheet material.

EXAMPLE EX4

The method according to example Ex3, providing a strip former and pushing the strip former into the package at locations of pre-cut strips in the blank of sheet material, thereby forming the pair spacers.

EXAMPLE EX5

The method according to example Ex4, comprising pushing the pre-cut strips of the blank of sheet material from opposite sides into the interior of the package.

EXAMPLE EX6

The method according to any one of examples Ex2 to Ex5, providing pair spacers in between pairs of packs only.

EXAMPLE EX7

The method according to any one of examples Ex3 to Ex6, comprising forming several pair spacers simultaneously.

EXAMPLE EX8

The method according to example Ex7, forming all pair spacers of a package simultaneously.

EXAMPLE EX9

Method according to any one of examples Ex4 to Ex8, wherein the strip former comprises at least one rotating lever.

EXAMPLE EX10

The method according to any one of examples Ex4 to Ex9, wherein the strip former comprises two counter-rotating levers.

EXAMPLE EX11

The method according to any one of examples Ex4 to Ex10, wherein the strip former comprises a series of pusher heads arranged in parallel and distanced to each other.

EXAMPLE EX12

The method according to any one of examples Ex2 to Ex11, comprising supplying the group of pairs of packs simultaneously into the package before forming the pair spacers.

EXAMPLE EX13

The method according to any one of examples Ex2 to Ex12, wherein the package forms an insert for a carton, and wherein the insert comprises all pair spacers and the pack spacer in the carton.

EXAMPLE EX14

The method according to any one of examples Ex3 to Ex13, wherein the pack spacer is manufactured by a horizontally arranged fold of the blank, the horizontally arranged fold extending into a receiving direction of the group of pairs of packs.

EXAMPLE EX15

The method according to any one of the preceding examples, wherein a vertical spacing is in a range between 2 millimeter and 10 millimeter, more preferably in a range between 4 millimeter and 8 millimeter, for example 6 millimeter, in the package.

EXAMPLE EX16

The method according to any one of examples Ex2 to Ex15, wherein a thickness of a pack spacer combined with a depth of one pack of the pair of packs amounts to a depth of a standard pack of 22 millimeter.

EXAMPLE EX17

The method according to any one of the preceding examples, wherein a horizontal spacing is at least 1.5 millimeter, and preferably is in a range between 2 millimeter and 20 millimeter, more preferably in a range between 4 millimeter and 12 millimeter, for example in a range between 4 millimeter and 7 millimeter.

EXAMPLE EX18

The method according to any one of examples Ex2 to Ex17, wherein a horizontal extension of a pair spacer combined with a width of a pack of the pair of packs amounts to a width of a standard pack of 56 millimeter.

EXAMPLE EX19

The method according to any one of examples Ex2 to Ex18, therein providing the pair spacers at a horizontal distance to each other in a range between 25 millimeter and 60 millimeter, more preferably between 30 millimeter and 55 millimeter in the package.

EXAMPLE EX20

The method according to any one of examples Ex2 to 19, wherein the pair spacers have a horizontal extension of at least 1.5 millimeter, and preferably have a horizontal extension in a range between 2 millimeter and 20 millimeter, more preferably in a range between 4 millimeter and 12 millimeter, for example in a range between 4 millimeter and 7 millimeter.

EXAMPLE EX21

The method according to any one of examples Ex2 to Ex10, comprising:
 adapting a horizontal extension of the pair spacers, and maintaining a distance between a center of a front side of a pack and a center of a front side of a neighbouring pack at 56 millimeter, dependent on a size of the packs.

EXAMPLE EX22

The method according to any one of the preceding examples, further comprising transporting the package to a tax stamp application device and providing a front of each pack of the group of pairs of packs in the package with a tax stamp.

EXAMPLE EX23

The method according to any one of the preceding examples, wherein the transport device is a horizontal transport device, and wherein a vertical spacing between the two packs of each pair of packs in the horizontal transport device and a horizontal spacing between each pair of packs in the horizontal transport device is kept constant while the group of pairs of packs is supplied to the package from the horizontal transport device.

EXAMPLE EX24

The method according to example Ex23, further comprising
 arranging a first pair of packs on the horizontal transport device,
 transporting the first pair of packs in a horizontal direction;

arranging a second pair of packs on the horizontal transport device; therein, for each of the first and second pair of packs, spacing a first pack of the pair of the packs and a second pack of the pair of packs vertically from each other and further spacing the first pair of packs and the second pair of packs horizontally from each other on the horizontal transport device.

EXAMPLE EX25

The method according to example Ex24, further comprising:
providing a supply of individual packs;
arranging the first pack in a vertical transport device;
arranging the second pack in the vertical transport device, thereby arranging the second pack vertically spaced from the first pack in the vertical transport device;
vertically transporting the first and the second pack in the vertical transport device; then
simultaneously pushing the first and second packs as a pair of packs out of the vertical transport device and into the horizontal transport device, wherein the first and second packs are transferred in a vertically spaced manner as the pair of packs to the horizontal transport device.

EXAMPLE EX26

A use of the method according to any one of the preceding examples in an application process of tax stamps.

Examples will now be further described with reference to the figures in which.

Figure 1:
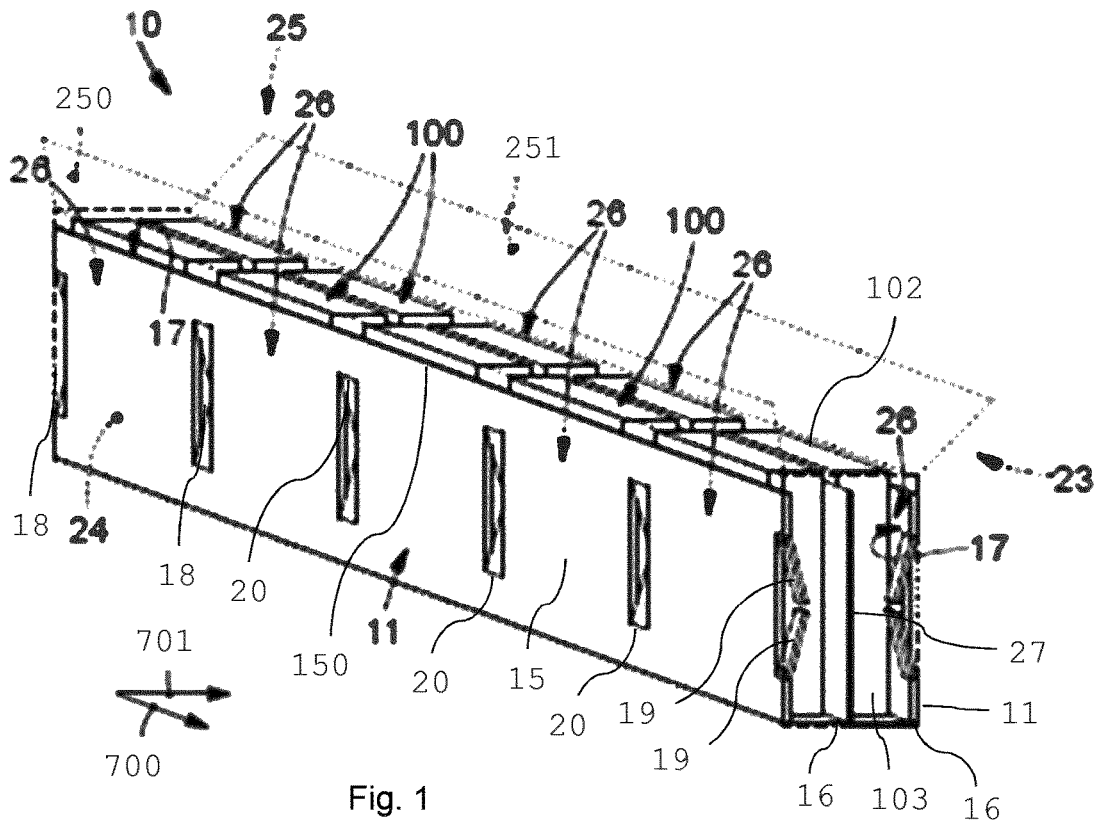
FIG. 1 shows a schematic perspective view of a package arranged inside a box-like carton.

FIG. 1 shows a filled insert 10 configured to be introduced into a carton 23 indicated by dotted lines. The carton having a body 24 configured to receive the filled insert 10 comprising a group of packs 100. The carton can be closed in a reclosable manner by a lid 25 consisting of two flaps 250, 251 hinged to body 24.

The flaps 250, 251 can be opened to have access inside the carton 23, for example to collect the packs 100 or to perform on them one or more processes, such as the application of tax stamps. Subsequently, the flaps can be shut again to close the box-like carton 23.

The filled insert 10 comprises the empty insert 11 and a plurality of packs 100 for aerosol-generating articles.

Each pack 100 has a parallelepiped shape and comprises two opposite large side walls 101, two opposite long small side walls 102, a lower wall 103 and a top wall 104. The top wall forms a front side in the transporting and collating process as described further below.

Preferably, the size of a pack 100 suitable for being supported by insert 11 are equal to 15.5 mm×48 mm, wherein these values correspond to the width and the height of the top walls 102. The width of the top wall 102 corresponds to the width of a pack 100. The height of the top wall 102 corresponds to the depth of a pack 100.

According to some embodiments described herein, insert 11 comprises two chambers 12, arranged adjacent with respect to one another. Each chamber 12 defines a housing for a corresponding row of packs 100.

The chambers 12 extend in a longitudinal direction which is indicated in the figures by reference numeral 700.

In a preferred embodiment and as shown in FIG. 1, each row comprises five packs of aerosol-generating articles 100.

Each chamber 12 comprises a bottom wall 14, and a pair of side walls 15, which extend from bottom wall 14. The side walls 15 are adjacent to the bottom wall 14 and are joined to the bottom wall 14 by folding lines 16. The folding lines 16 extend parallel to the longitudinal direction 700.

Each wall of the chambers 12, that is the bottom wall 14 and the pair of side walls 15, is configured to come into contact with a respective wall of the packs 100.

For example, the side walls 15 of the two chambers 12 arranged in the interior of the insert 11 for a pack spacer 27 and come into contact with the large side walls 101 of the packs 100. The bottom walls 14 come into contact with the lower walls 103 of the packs. In the example shown in FIG. 1, the packs 100 accommodated in the insert 11 are oriented in a manner that a direction of largest extension of the pack is orthogonal with respect to the longitudinal direction 700. In addition the packs 100 are oriented such that the top walls 102 are arranged opposite the bottom wall 14 of the insert 11.

The chambers 12 comprise an access aperture 17 through which the packs 100 can be introduced, accessed as well as extracted from the insert 11.

The bottom and side walls 14, 15 are arranged one with respect to the others so that each chamber 12 is shaped in the shape of the letter U, where the open end of the U defines the access aperture 17. The packs 100 are oriented in such a way that the top wall 102 is arranged near the access aperture 17. In particular, the top wall 102 projects beyond an end edge 150 of the side walls 15 arranged on the opposite side with respect to the bottom wall 14. By this, the top wall 102 of the packs 100 remains exposed and easily accessible to perform the necessary processes on it, such as for example the application of the tax stamp. The top walls 102 of the packs may also be arranged at the same level than the end edge 105 of the insert 11. By this, also the top wall side of the packs are protected by the insert 11.

At least one of the side walls 15 comprises a plurality of pair spacers 18 projecting towards the inside of the insert 11. The pair spacers 18 are configured to delimit the pack compartments 26, in which each of said packs 100 is stably arranged and held in a defined manner in the longitudinal direction 700 relative to the insert 11. By the pair spacers 18 a movement of the packs in the longitudinal direction 700 is prevented. By the side walls 15 and the pair spacer 27 a movement or displacement in 701 direction is prevented.

The packs 100 can be introduced and extracted with respect to the pack compartments 26 through the aforementioned access aperture 17.

In preferred embodiments, the pair spacers 18 are made as pre-cut fins 19, integrated into the side wall 15.

In the embodiment shown in FIG. 1, each pair spacer 18 consists of a pair of fins 19. Each fin 19 is joined to the side wall 15 by a respective joining line 20. The fins are separated from one another by a cutting line 21 (seen in the blanks shown in FIGS. 4 and 5). The joining lines 20 and the cutting line 21 are mutually parallel to each other and are also parallel to the longitudinal direction 700.

In an alternative embodiment, not shown, each pair spacer 18 consists of a single fin 19. In this case, the fin 19 can extend from a joining line 20, which connects the fin to the side wall 15, up to the end edge 150.

In FIG. 1, in which each chamber is intended to accommodate a row of five packs 100, six pair spacers 18 are provided. Four pair spacers 18 are interposed between two adjacent packs 100. The remaining two pair spacers 18 are arranged at opposite ends of the side wall 15 so as to hold the outermost pack 100 arranged at the end of the row. An interspace separating two adjacent packs 100 is defined by the pair spacers 18. This interspace may be equal to, slightly greater than or slightly smaller than the width of the fins 19, measured parallel to the longitudinal direction 700.

In preferred embodiments, pair spacers 18 are only provided in between packs. Thus, in these embodiments no pair spacers are provided at the opposite ends of the side walls 15 in longitudinal direction.

The two inner side walls 15 forming the pack spacer 27 are not provided with pair spacers 18. The pair spacers 18 are provided on the side walls 15 of the chambers 12, which remain visible and accessible from the outside.

The inner surfaces of the side walls 15 facing towards the inside of the insert 11 are arranged according to a configuration of symmetry with respect to one another with reference to a centreline axis 920 of the bottom wall 14, which extends parallel to the longitudinal direction 700.

In an embodiment, a centre distance 910, measured in a transverse direction 701, which is substantially orthogonal to the longitudinal direction 700 has a predetermined and constant value. Centre distance 910 is defined between the centrelines 920 of the bottom walls 14 of the chambers 12. For example, the centre distance 920 can be approximately equal to 22.5 mm as shown in FIG. 2 and FIG. 3.

Figure 2:
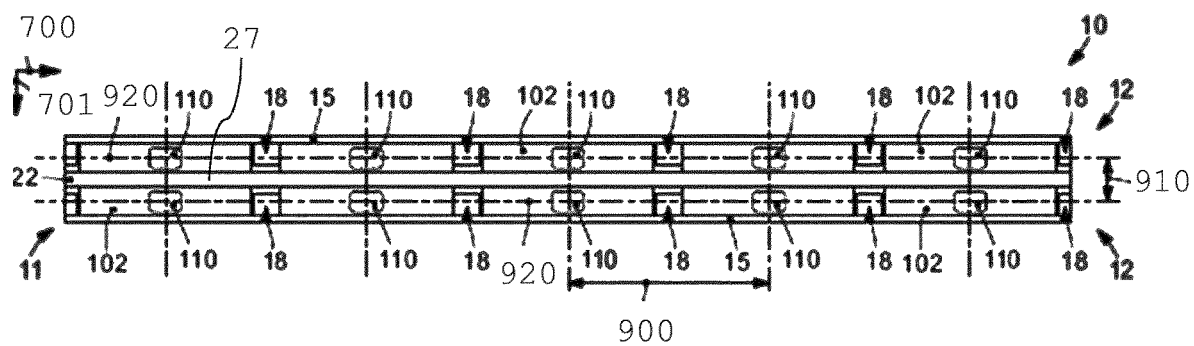
FIG. 2 shows a schematic top plan view of a filled package using the method according to the invention.

FIG. 2 shows a method of use of the empty insert 11 and filled insert 10 according to the present invention that is briefly illustrated with reference to the application step of a tax stamp 110 on the packs 100.

Figure 3:
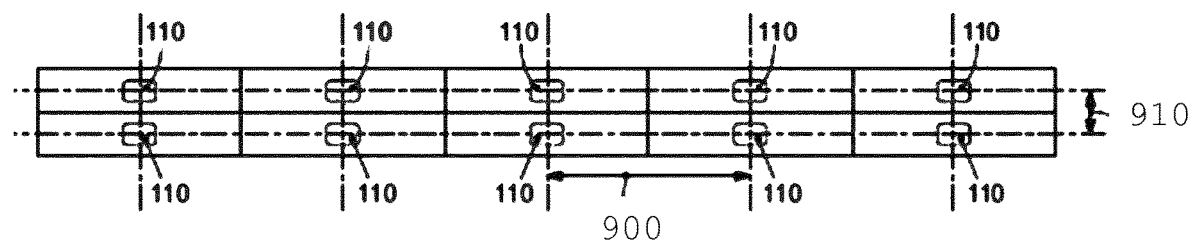
FIG. 3 is a schematic, top plan view of a group of packs of smoking articles of the type known in the art.

FIG. 3 shows an ordered group of packs of traditional smoking articles, ordered according to two overlapped rows of five packs each. Neighbouring packs are in direct contact with each other.

FIGS. 2 and 3 allow to compare the situation presented by using an insert 11, which accommodates a plurality of non-standard packs 100, having a smaller size than the standard size of traditional packs (FIG. 3), in comparison with the recurring situation in the prior art, in which the tax stamp 110 must be applied to a group of packs of traditional smoking articles, without the insert shown in FIG. 2.

As can be seen from the comparison between the figures, the outermost profile of the insert 11 delimits an area, which is identical to the total area occupied by the group of traditional packs. In other words, the insert 11 is shaped and sized in such a way as to compensate for the smaller volumes occupied by the non-standard packs so that the latter, when received in the insert 11, substantially occupy the same volumes as a group of traditional packs.

Moreover, the position of the tax stamps remains unchanged in both cases. Due to the presence of the insert 11, the two-dimensional spatial coordinates in the longitudinal and transverse directions 700, 701 of the tax stamps 110, applied to the packs 100, remain identical to the corresponding coordinates of the homologous tax stamps applied on traditional packs of smoking articles as shown in FIG. 3.

The tax stamps 110 are arranged one after the other at a stamp distance 900, measured in the longitudinal direction 700. Stamp distance 900 is equal to a predetermined and constant value and is measured between a center of two tax stamps 110 applied on two adjacent packs 100 in direction 700. In a preferred embodiment, the stamp distance 900 is at least equal to or greater than a characteristic size of the pack 100, preferably defined as the width of the large side walls 101 and of the top and bottom wall 101, 102. Preferably, the stamp distance 900 is equal to a width of a standard pack corresponding to 48 millimeter.

In FIG. 2, the pair spacers 18 are arranged one after the other, also at a stamp distance 900. Stamp distance 900 is equal to a predetermined and constant value, so as to arrange and hold the packs 100 in their respective pack compartments 26 at a constant pitch with respect to each other, which is correlated with the stamp distance 900.

It is evident that the shapes, the dimensional values and the thicknesses mentioned in the present description are merely illustrative, and can be modified, depending on the sizes and shapes of the packs of aerosol-generating articles to be accommodated in insert 11. In particular, the insert 11 has related sizes and thicknesses, in particular complementary to sizes and depth of the pack 100, which it must support, in order to maintain the same total volumes of a group of traditional packs and to arrange the packs in positions, such that the tax stamp can be applied in the same positions (or coordinates) with respect to the conventional case.

Figure 4:
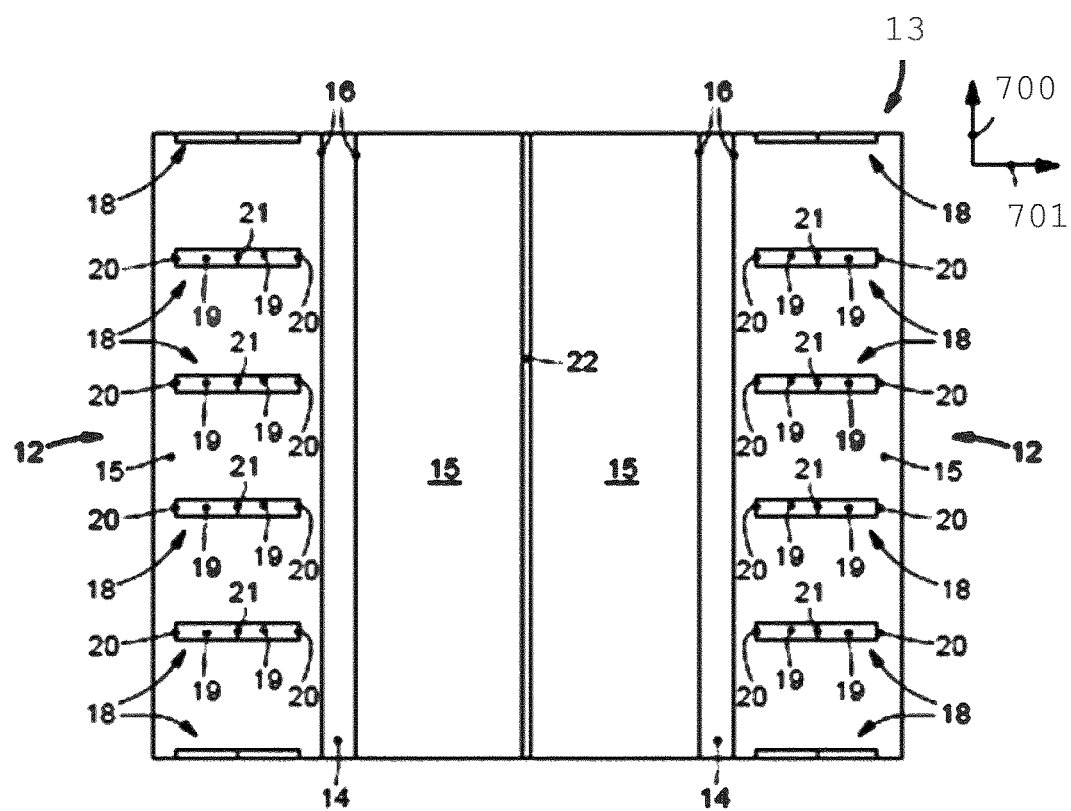
FIGS. 4 and 5 are top plan views of design variants of prepared blanks of sheet material for forming a package.
Figure 5:
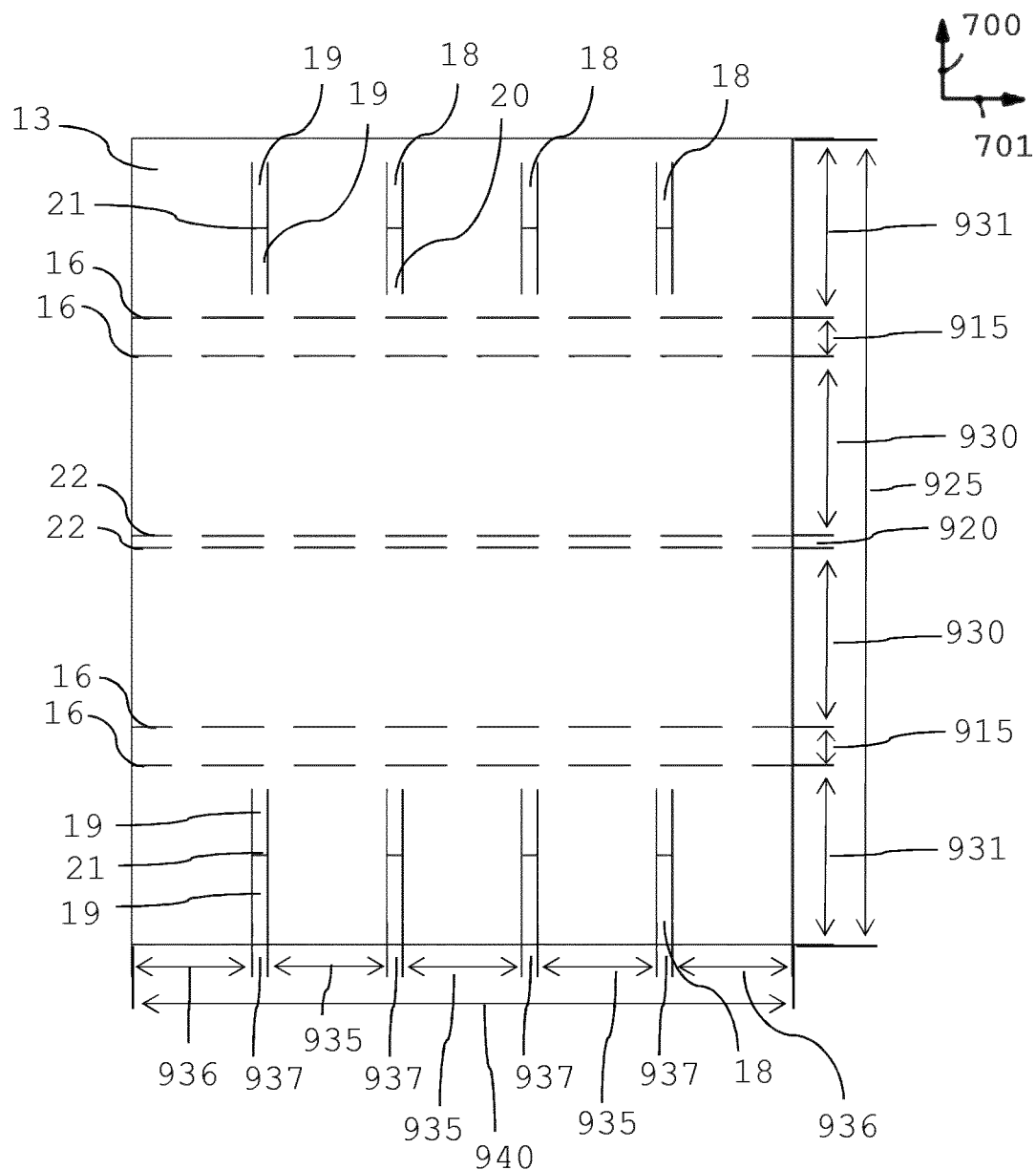

FIG. 4 and FIG. 5 show two alternative embodiments of blanks of sheet material 13 to form an insert 11.

In FIG. 4, a blank material is shown for forming an insert 11 of FIG. 1. In the example of FIG. 4 the two chambers 12 are integrated into a single body. Two side walls 15 of two chambers 12 are joined along a creasing line 22 defining a hinge around which each chamber 12 can rotate by a certain angle with respect to the other chamber 12.

The chambers 12 are made starting from the sheet material 13, for example paper, cardboard or paperboard having a suitable thickness to ensure the necessary mechanical strength.

Preferably, the blank 13 is corrugated cardboard having a homogeneous thickness of about 3 millimeter to about 3.5 millimeter. The blank 13 may also be made of materials other than those mentioned above, such as for example plastics.

In FIG. 5, the blank 13 is shown where pair spacers 18 are provided only within the blank in order for the pair spacers to be arranged between packs only. The same reference numbers are used for the same or similar elements. In blank 13 exemplary sizes are indicated as follows:

Thickness or width 920 of the pack spacer: 5 millimeter
Extension 940 of blank in direction 700: 274.6 millimeter
Extension 925 of blank in direction 701: 277 millimeter
Height 930 of pack spacer/height 931 of side wall 15: 74.6 millimeter
Thickness 915 of chamber 15: 15.9 millimeter
Distance 935 between adjacent pair spacers 18: 49.5 millimeter
Distance 936 between pair spacer 18 and end of blank (direction 700): 50.05 millimeter
Width 937 of a pair spacer 18: 5.6/6.5 millimeter
Pack sizes: 74.5×48.5×15.8 millimeter Forming of the insert 11 out of the blank 13 essentially comprises the following steps:

In a first step, the two chambers 12 are formed. In this step, the blank 13 is folded in opposite directions along folding lines 22 and 16. The side walls 15 are folded with respect to the bottom wall 14 along the folding lines 22 and 16 so as to obtain the shape of the two adjacent chambers in the shape of the letter U. The two inner side walls form the pack spacer 27.

In a second step, the insert 11 is accommodated in a carton 23.

In a third step an ordered group of packs 100 is accommodated in the insert.

In a fourth step the pair spacers 18 are formed and the packs 100 secured in the insert 11 against displacement in longitudinal direction 700.

Figure 6:
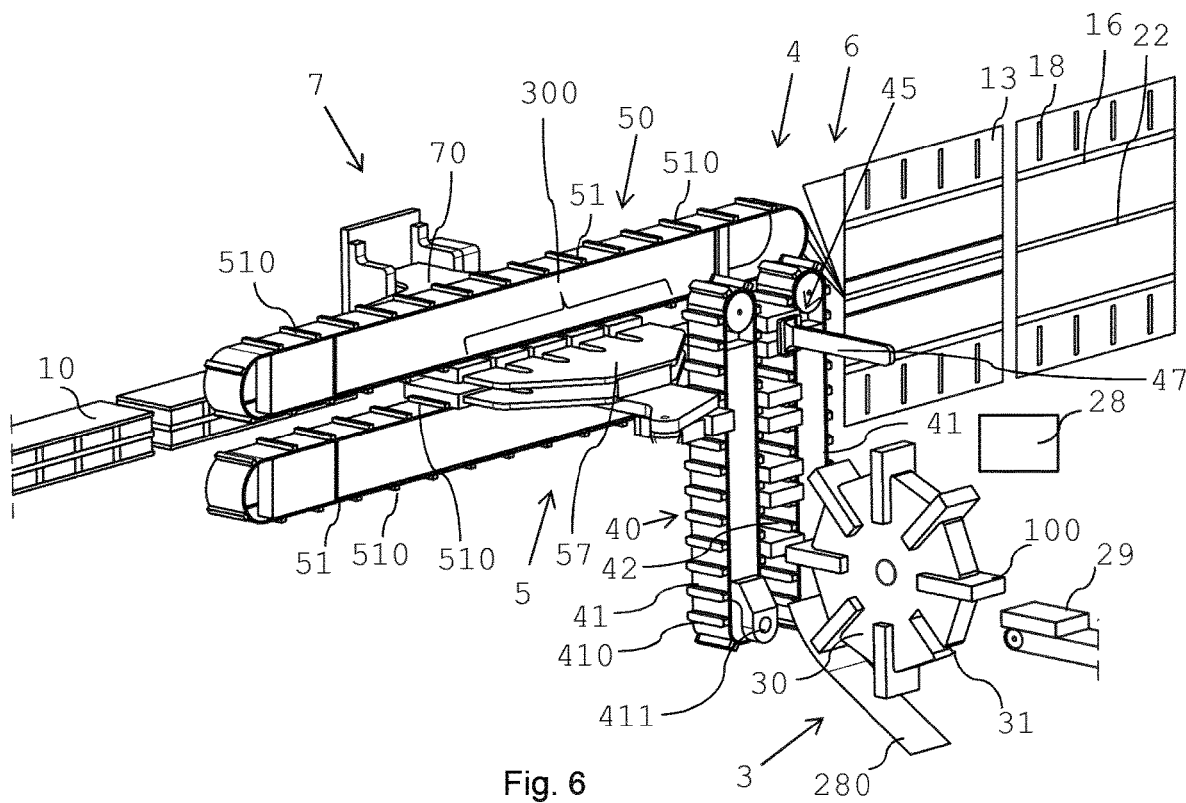
FIG. 6 is a perspective view of a method for collation of packs.

FIG. 6 shows a schematic overview of a system comprising supplying, collating and packing of individual packs 100 in preparation for tax stamp application. The system comprises pack supply 3, various pack collation preparation stations 4,5, insert provision and insert formation 6,7 as well as packing and transport in between, during and after pack collation and packing.

A supply wheel 30 comprises several pockets 31 arranged around the circumference of the supply wheel. The packs 100 are fed into the pockets 31 from a pack provider 29 at a receiving location of the supply wheel 30. After having been accommodated in a pocket 31 a pack is transported to a supply location by counter clock-wise rotation of the supply wheel 30. The supply location is arranged opposite the receiving location. In the supply location a pack 100 is fed from the supply wheel 30 into a vertical transport device 40. Thereby, the pack 100 is pushed out of the pocket 31 of the supply wheel 30 into a pack space 42 in the vertical transport device 40.

A control station 28 is provided next to the supply wheel 30 for controlling the packs 100 passing the control station 28. For example, the packs 100 may be optically inspected for correct code application, damaged wrapper or similar. The control station 28 may detect non-conform packs 100 and may be connected to a rejection mechanism of the supply wheel 30. The rejection mechanism inhibits a transfer of a non-conform pack to the vertical transport device 40. Instead such non-conform packs may be discharged along slide 280 arranged below the supply wheel 30.

The vertical transport device 40 comprises two closed-loop conveyor belts 41 arranged vertically and parallel to each other. The belts 41 comprise equidistantly arranged treads 410. The treads 410 of both conveyor belts 41 are arranged perpendicular to a vertical moving direction of the belts 41. In addition, the treads 410 of the belts are facing each other and arranged at same vertical levels. The belts 41 with their treads 410 define individual pack spaces 42 for accommodation of one pack. Drive wheels 411 move the belts 41 in opposite directions such that the formed pack space 42 in between the two belts and in between two neighbouring treads in each belt 41 are moved vertically upwards.

The belts 41 are moved step-wise by the distance of one pack space 42, such that a next pack space is located in the supply location for being supplied by a pack from the supply wheel 30. The two packs 100 supplied to the vertical transport device 40 are vertically distanced from each other by at least the height of the treads 410 arranged in between the packs. When two packs 100 have been supplied to the vertical transport device 40, the drive wheel accelerates such that the belts 41 move upward by the distance of two pack spaces. By this, a pack space 42 is left empty. Each two packs 100 accommodated in following pack spaces form a pair 200 of packs. The packs in the vertical transport device 40 are moved upwards until a pair 200 of packs has reached a transfer location 45. The pair 200 in the transfer location 45 is transferred to a horizontal transport device 50. The pair of packs 200 is pushed by a pair pusher 47 in a horizontal direction into a space between two conveyor belts 51 of the horizontal transport device 50. Thereby the packs are guided along the treads 410 of the conveyor belts 41 of the vertical transport device 40 and are held sideways in horizontal direction by the belts 41. The pair pusher 47 performs a linear movement. The empty pack space 42 in the vertical transport device 40 serves the pair pusher 47 to retract without interference with the belts 41 or packs 100 or slowing down of the processing speed of the vertical transport device 40 such that the pair pusher 47 can return to its initial position as shown in FIG. 1.

The pair of packs 200 once transferred to the horizontal transport device 50 is then moved in horizontal direction (to the left in FIG. 1) such that a next pair 200 of packs may be transferred from the vertical transport device 40 to the horizontal transport device 50. The pairs 200 of packs are separated in a horizontal direction by space bars 510 provided on the belt conveyors 51 of the horizontal transport device 50.

Figure 7:
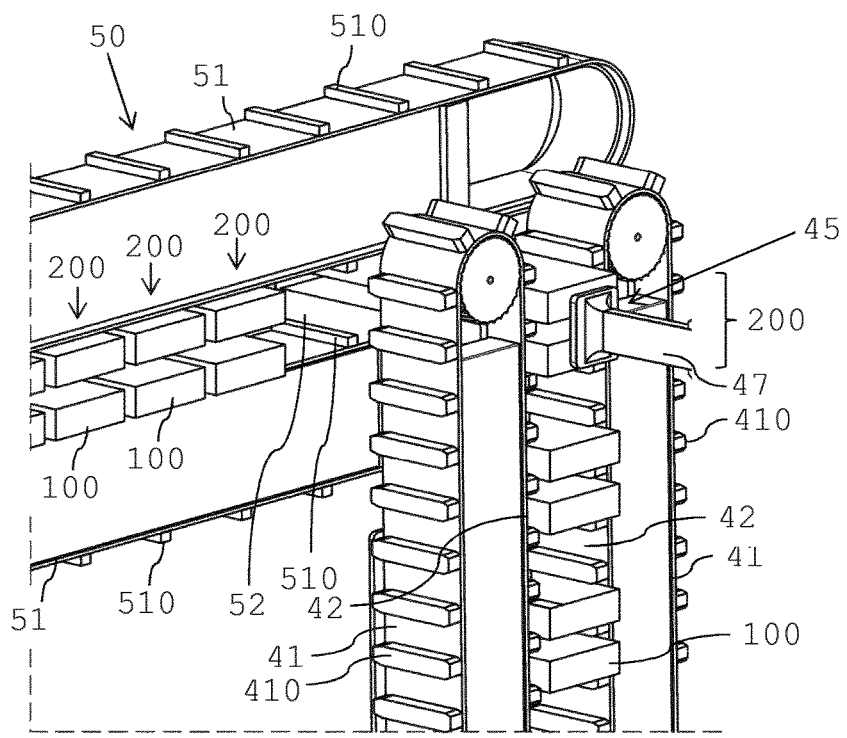
FIGS. 7 and 8 show the transfer of pairs of packs from a vertical to a horizontal transport device.
Figure 8:
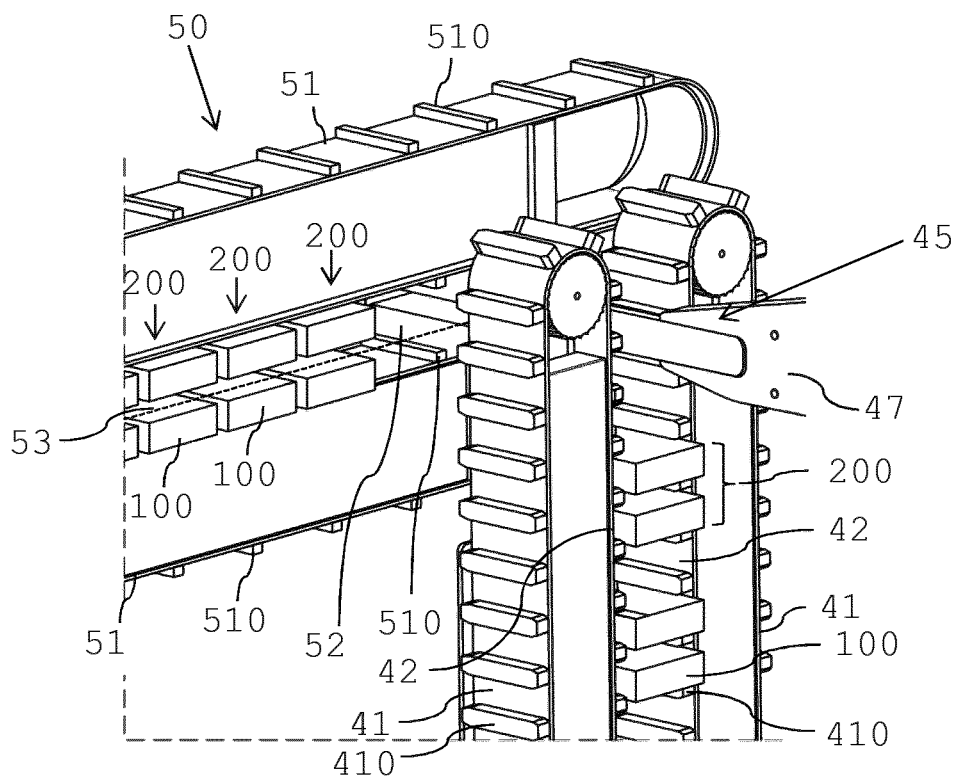

The transfer of the pairs of packs 200 to the horizontal transport device 50 is shown in more detail with reference to FIGS. 7 and 8.

When a group 300 of pairs of packs has been formed in the horizontal transport device 50, the group is pushed by a block pusher 57 into an insert (not seen in FIG. 1). The insert has at this stage partly been formed from a blank of sheet material 13 provided with creasing lines 22 and pre-cuts 18 as has been described above. In the system of FIG. 1 the blanks of sheet material 13 are supplied from the right. The blank is folded along creasing lines 22 and 16 to form an empty insert with pack spacer 27. After the group 300 of pairs of packs has been pushed into the insert, the pair spacers 18 are formed with a strip former 70 (arranged behind horizontal transport device 50). The filled inserts 10 are then transported further along to a carton station where the filled inserts 10 are accommodated in a carton 23 or where a carton is folded around the filled inserts 10.

All supplies, transfers, transports and manufacturing steps are synchronized in the system. Preferably, the drive wheels of the vertical transport device 40 define the clock of the system.

In FIG. 7 and FIG. 8 the arrangement of the packs 100 in the vertical transfer device 40, the transfer of a pair 200 of packs and the arrangement of the pair of packs in the horizontal transfer device 50 are shown in more detail.

In the vertical transfer device 40, the packs 100 are arranged pair-wise in the pack spaces 42 formed between the two vertical conveyor belts 41 and the treads 410 arranged regularly over the length of the conveyor belts 41. Packs 100 are arranged in two pack spaces 42 following each other while a following pack space 42 is kept empty, the following two pack spaces again are provided with packs followed by an empty pack space. When a pair 200 of packs has arrived in the transfer location 45 at an upper end of the vertical transport device 40 the conveyor belts 41 are stopped. The pair pusher 47 pushes the two packs 100 of the pair 200 of packs simultaneously out of the pack space 42 and in between the two belts 51 of the horizontal transport device 50 as shown in FIG. 8. When the pair 200 has been transferred, the vertical transport device 40 is activated again such that a next pair of packs is arranged in the transfer location 45. The pair pusher 47 is retracted while the empty pack space 42 passes the transfer location 45. Preferably, the pair pusher 47 is retracted at a higher speed when retracting in order to be safely positioned in its starting position again for pushing the next pair 200 of packs to the horizontal transport device when said pair 200 has arrived in the transfer location 45.

The horizontal transport device 50 comprises two closed-loop conveyor belts 51 arranged horizontally and parallel to and above each other. The belts 51 comprise equidistantly arranged space bars 510. The space bars 510 of both conveyor belts 51 are arranged perpendicular to a horizontal moving direction of the belts. In addition, the space bars 510 of the belts are facing each other and are arranged at same horizontal positions. The belts 51 with its space bars 510 define individual pair spaces 52 for accommodation of one pair 200 of packs. Drive wheels (not shown) move the belts 52 in opposite directions such that the formed pair spaces 52 in between the two belts 51 are moved horizontally to the left in FIG. 7.

The pair 200 of packs supplied to the horizontal transport device 50 are horizontally distanced from each other by the width of a space bar 510 arranged in between the pair 200 of packs. The space bars 510 of the upper conveyor belt 51 horizontally maintain a distance between the upper pack 100 of the pair 200 of packs while the space bars 510 of the lower conveyor belt 51 horizontally space the lower pack 100 of the same pair 200 of pack by a same distance.

A partition element 53 (schematically shown in FIG. 8 only by a dotted line) is provided to keep the packs 100 of the pair 200 of packs vertically spaced in the horizontal transport device 50. The partition element 53 is a plate, horizontally arranged in between the two belts 51 of the horizontal transport device 50 and in between the two packs 100 of a pair 200 of packs. Preferably, the thickness of the partition element 53 is identical to the height of the treads 410 of the vertical transport device 40. Since the pairs 200 of packs are vertically spaced from each other by at least the height of the treads 410 in the vertical transport device, upon a transfer of the pairs of packs into the horizontal transport device 50—an upper pack is arranged above the partition element 53, a lower pack is arranged below the partition element.

The belts 51 are moved step-wise by the distance of one pair space 52, such that a next pair space 52 is located in the transfer location 45 for being provided with a pair 200 of packs from the vertical transport device 40. This is repeated until a group 300 of pairs of packs, for example five pairs of packs has been transferred to the horizontal transport device 50 into subsequent pair spaces 52. Preferably, the partition element 53 is arranged stationary in the horizontal transport device 50. Preferably, the packs 100 glide along the surface of the partition element 53 while being horizontally transported.

When a group 300 of pairs 200 of packs 100 has been transferred to the horizontal transport device 50, the drive wheel accelerates such that the belts 51 move horizontally by the distance of two pair spaces 52. By this, an empty pair space 52 is created.

Figure 9:
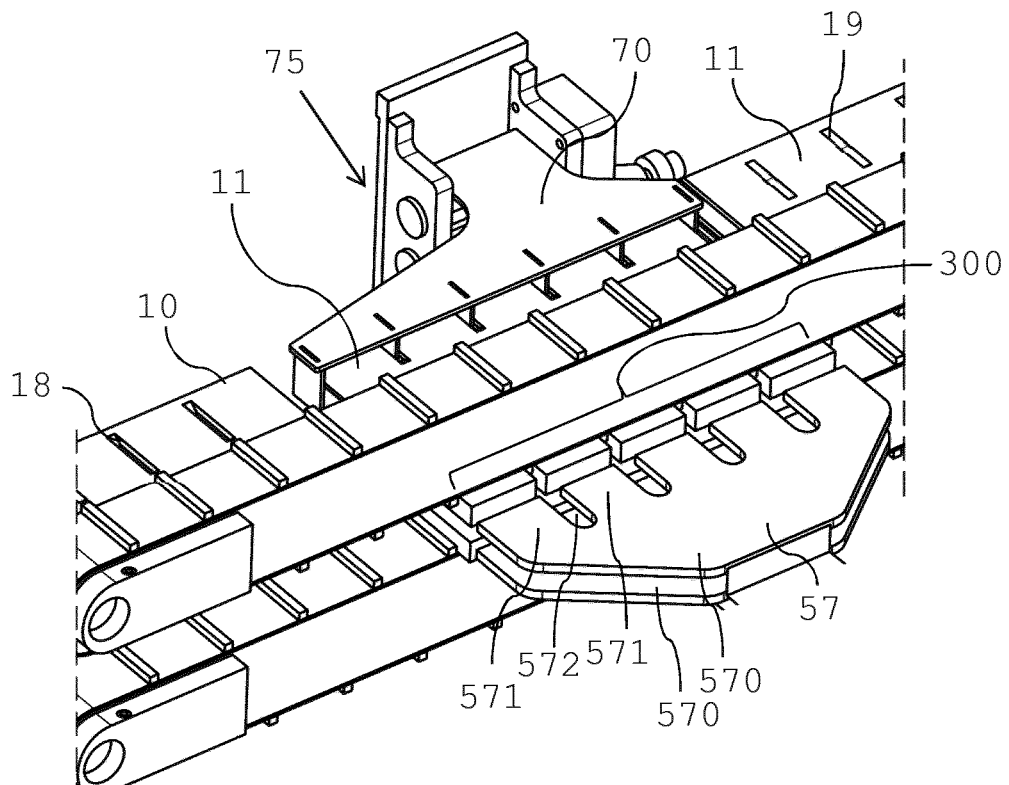
FIGS. 9 and 10 illustrate the group-wise insertion of a group of pairs of packs into a package.
Figure 10:
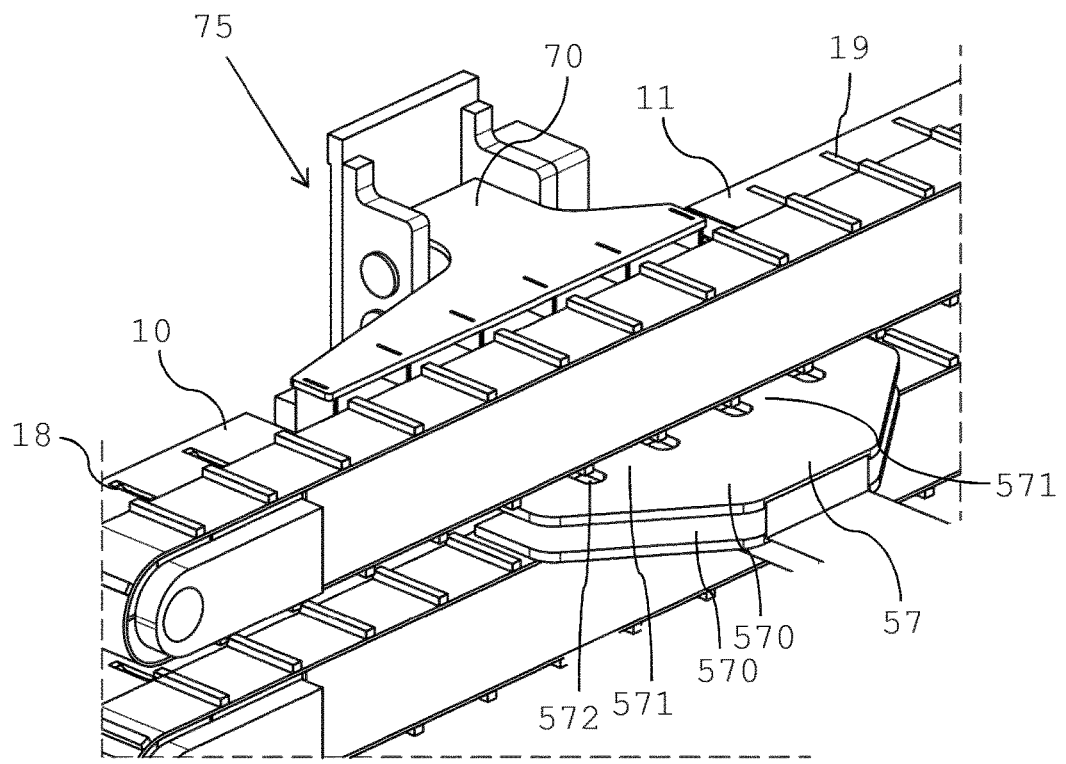

In FIG. 9 and FIG. 10 a group 300 of pair of packs has been formed in the horizontal transport device 50 and transported to an insertion location 75. The block pusher 57 is also arranged in the insertion location 75. The block pusher 57 comprises two identical plates 570 arranged above each other and extending over the horizontal extension of the group 300 of pairs of packs. Each plate comprises five pusher ends 571 separated by longitudinal recesses 572. The five upper packs of the group 300 are each pushed by the five pusher ends 571 of the upper plates 570 and the five lower packs of the group 300 are each pushed by the five pusher ends 571 of the lower plate 570 of the block pusher 57. All ten packs 100 are pushed simultaneously into an empty insert 11 previously formed and positioned in the insertion location 75 opposite the block pusher 57.

The block pusher is arranged at a horizontal and vertical level such that the pusher ends 571 each push one pack 100 of the group 300 of pairs of packs. The block pusher 57 is horizontally and linearly moveable to perform the pushing action.

As shown in FIG. 10, the pusher ends 571 pass next to the space bars 510 of the horizontal conveyor belts 51. However, the recesses 572 in the plates 570 of the block pusher 57 guarantee that a pushing as well as a retracting action of the block pusher may be performed without interference of block pusher with space bars.

The space bars 510 serve as guiding means for the packs 100 and secure a horizontal spacing between the packs upon transfer of the packs into the empty insert 11.

The vertical distance between plates of the block spacer 57 allows the space bars 510 as well as the partition element 53 to extend in between the plates 570 without hindering the transfer process of the group 300 of pairs of packs.

The vertical spacing between the packs 100 of a pair 200 of pack is maintained by the pack spacer 27 of the insert. This may better be seen in the cross sectional view of the insertion process shown in FIG. 11 further below.

A strip former 70 is arranged vis-à-vis the block pusher 57, opposite the horizontal transport device 50. The strip former 70 comprises two counter rotating levers 71 (only an upper lever is shown in FIGS. 9 and 10). Each lever comprises six pusher heads 710, wherein the four pusher heads 710 in the center of the levers 71 are used for forming pair spacers 18 in the insert. As may best be seen in FIG. 10, the first and last pusher head 710 of the strip former 70, that is a pusher head arranged most upstream and most downstream when seen in the transport direction of the inserts, is arranged next to the insert. Thus, the most upstream and most downstream arranged pusher heads 710 secure the most upstream and most downstream pairs 200 of packs of the group 300 of pairs accommodated in the insert 11 versus a horizontal displacement while the pair spacers 18 are formed.

Inserts 11 provided with the pack spacer 27 but no pair spacers, which inserts have been folded from blanks of sheet material, are guided parallel to the conveyor belts 51 of the horizontal transport device 50 to the insertion location 75. An empty inserts 11 in the insertion location 75 is supplied with the group 300 of pairs of packs. The pair spacers 18 are subsequently formed with the strip former 70, which is shown in more detail with reference to FIG. 11 below. The so filled inserts 10 are then transported further along to a carton station where the filled inserts 10 are accommodated in a carton 23.

Figure 11:
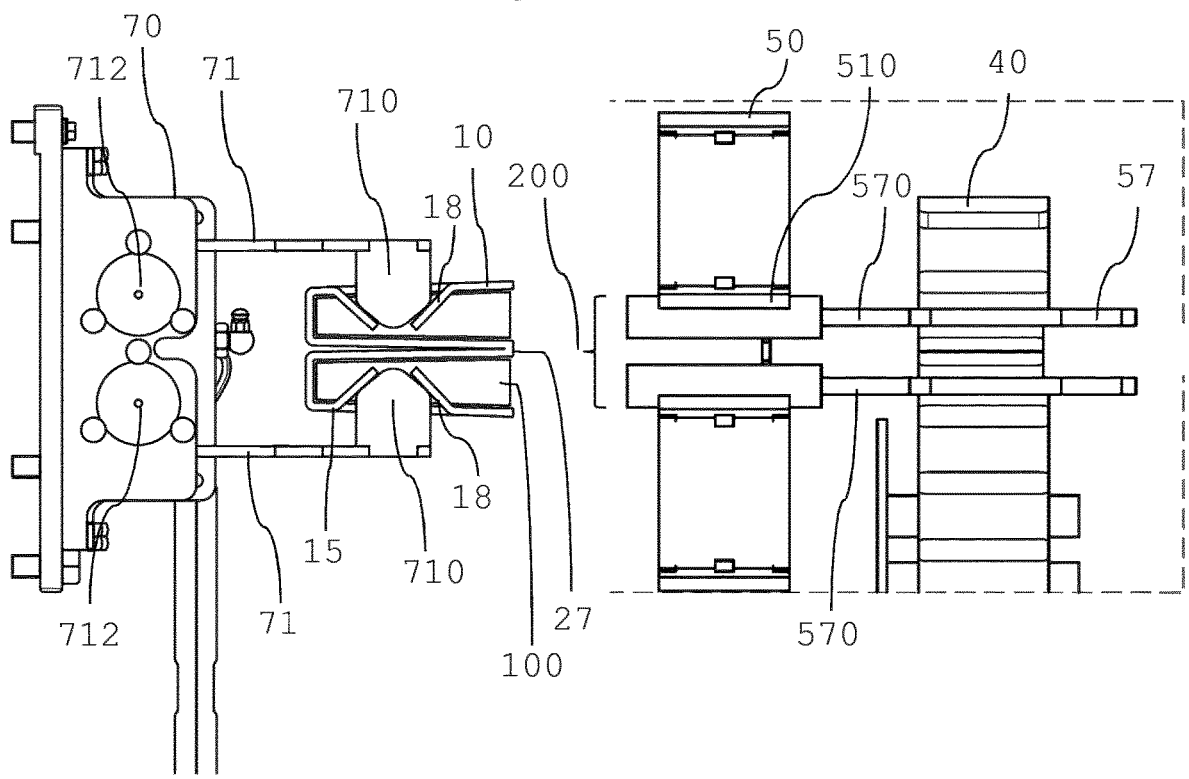
FIGS. 11 and 12 show cut side views of a part of the insertion process of FIGS. 9 and 10 and a pair spacer forming process.

In the middle of FIG. 11 the two plates 570 of the block pusher 57 are in a position to push the pair 200 of packs out of the conveyor belts 51 of the horizontal transport device 50. The two packs of a pair are thereby guided by the space bars 510. The packs 100 are inserted in the insert 11 and kept vertically spaced by the pack spacer 27. The pack spacer 27 keeps the packs 100 vertically spaced by about the same distance as previously the partition element of the horizontal transport device 50.

Figure 12:
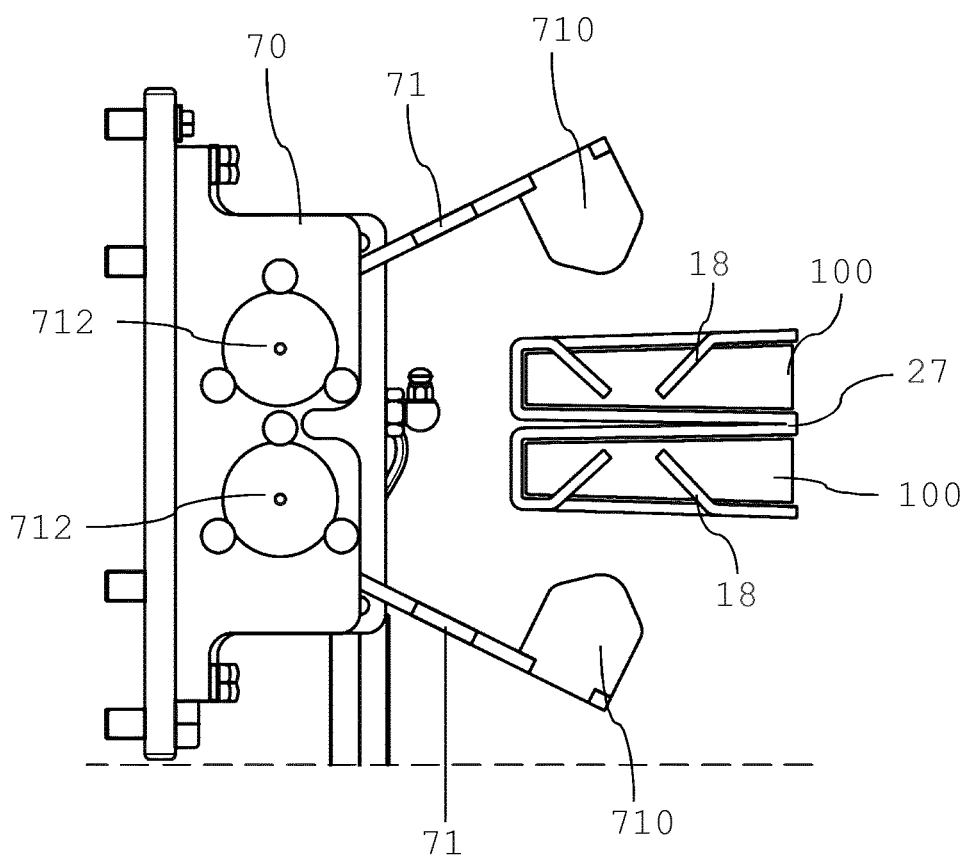

On the left side of FIG. 11 the strip former 70 is shown in a status where the pair spacers 18 have been formed in opposite sides walls 15 of the insert and where the pusher heads 710 are still in their forming position. In FIG. 12 the pusher heads 710 are shown in their retracted position.

The pre-cut fins 19 in the blank of sheet material have been pushed by the pusher heads 710 from opposite sides of the insert into the interior of the filled insert 10. Each two fins form a partial pair spacer for upper and for lower packs 100 of a pair of packs.

The counter rotating levers 71 are rotatable in opposite directions around two axis 712. In the forming position the levers 71 are arranged parallel to each other such that the pusher heads 710 perform a symmetric action on the pre-cut fins 19 of a partial pair spacer. The pusher heads 710 are small plates with a triangular end. The plane of the plate is arranged parallel to the long small sides 102 of the packs. The form of the triangular end defines the final position of the fins 19 forming the pair spacer 18.

Preferably, the thickness of a pusher head 710 is smaller than the width of a pre-cut fin 19 such as to push the pre-cut fins only without contacting the packs 100.

For the purpose of the present description and of the appended claims, except where otherwise indicated, all numbers expressing amounts, quantities, percentages, and so forth, are to be understood as being modified in all instances by the term "about". Also, all ranges include the maximum and minimum points disclosed and include any intermediate ranges therein, which may or may not be specifically enumerated herein. In this context, therefore, a number A is understood as A plus or minus two percent of A.

The invention claimed is:

1. Method for filling a package with a group of pairs of packs, comprising:
   supplying a group of pairs of packs simultaneously from a transport device to a package,
   vertically spacing the two packs of each pair of packs of the group of pairs of packs from each other in the package,
   horizontally spacing each pair of packs from each other in the package,
   maintaining a horizontal spacing between each pair of packs of the group of pairs of packs while supplying the group of pairs of packs to the package by guiding the pairs of packs of the group of pairs of packs along space bars provided in the transport device,
   supplying a blank of sheet material and manufacturing a pack spacer and pair spacers from the blank of sheet material, the pack spacer is provided in the package for the vertical spacing between packs of pairs of packs and the pair spacers are provided in the package for the horizontal spacing between pairs of packs, therein
   providing a strip former and pushing the strip former into the package at locations of pre-cut strips in the blank of sheet material, thereby forming the pair spacers, and
   supplying the group of pairs of packs simultaneously into the package before forming the pair spacers.

2. Method according to claim 1, comprising pushing the pre-cut strips of the blank of sheet material from opposite sides into the interior of the package.

3. Method according to claim 1, comprising forming several pair spacers simultaneously.

4. Method according to claim 1, wherein the strip former comprises two counter-rotating levers.

5. Method according to claim 1, wherein the strip former comprises a series of pusher heads arranged in parallel and distanced to each other.

6. Method according to claim 1, wherein the package forms an insert for a carton, and wherein the insert comprises all pair spacers and the pack spacer in the carton.

7. Method according to claim 1, wherein the pack spacer is manufactured by a horizontally arranged fold of the blank of sheet material, the horizontally arranged fold extending into a receiving direction of the group of pairs of packs.

8. Method according to claim 1, wherein the transport device is a horizontal transport device, and wherein a vertical spacing between the two packs of each pair of packs in the horizontal transport device and a horizontal spacing between each pair of packs in the horizontal transport device is kept constant while the group of pairs of packs is supplied to the package from the horizontal transport device.

9. Method according to claim 8, further comprising
   arranging a first pair of packs on the horizontal transport device,
   transporting the first pair of packs in a horizontal direction;
   arranging a second pair of packs on the horizontal transport device;
   therein, for each of the first pair of packs and the second pair of packs spacing a first pack of the pair of packs and a second pack of the pair of packs vertically from each other and further spacing the first pair of packs and the second pair of packs horizontally from each other in the horizontal transport device.

10. Method according to claim 9 further comprising:
    providing a supply of individual packs;
    arranging the first pack in a vertical transport device;
    arranging the second pack in the vertical transport device, thereby arranging the second pack vertically spaced from the first pack in the vertical transport device;
    vertically transporting the first pack and the second pack in the vertical transport device; then
    simultaneously pushing the first pack and the second pack as a pair of packs out of the vertical transport device and into the horizontal transport device, wherein the first pack and the second pack are transferred in a vertically spaced manner as the pair of packs to the horizontal transport device.

11. Use of the method according to claim 1 an application process of tax stamps.

* * * * *